Patented Apr. 7, 1925.

1,533,033

UNITED STATES PATENT OFFICE.

JOHAN NICOLAAS ADOLF SAUER, OF AMSTERDAM, NETHERLANDS.

PROCESS FOR TREATING LIQUIDS.

No Drawing.    Application filed October 25, 1922.   Serial No. 596,906.

*To all whom it may concern:*

Be it known that I, JOHAN NICOLAAS ADOLF SAUER, a subject of the Queen of the Netherlands, residing at Amsterdam, den Texstraat 2, Kingdom of the Netherlands, have invented certain new and useful Improvements in a Process for Treating Liquids, of which the following is a specification.

It is well known that for the purpose of purifying liquids, for example sugar juices, lime or other alkali or alkaline earth is employed either alone or in combination with acids. If lime alone be employed it is generally added in small quantities to the liquid. In purifying sugar juices in any case some of the lime forms salts with the natural acids already present in the juice, and these lime salts are mostly insoluble. If small quantities of lime are used the liquid generally cannot be filtered off direct and it is then necessary to decant the juice in order to separate it, from the insoluble matters.

In order to obtain a more intense purification and to allow of a more rapid decantation or filtration in the separation of sugar juice, larger quantities of lime are employed, and the excess of lime is neutralized by added acids which form practically insoluble lime salts.

The formation of the insoluble salts by means of lime and acid, both of which are added to the juice, has heretofore usually been effected in the liquid itself. This method has various disadvantages.

According to the present invention liquids are treated with practically insoluble salts which have been precipitated externally (and preferably freshly precipitated) such compounds being so chosen that they act on the liquid mainly or entirely by virtue of physical action, e. g., adsorption. Such salts may be termed adsorbent salts. Lime salts will be described hereinafter, as typical examples of such compounds but the invention is not limited thereto as other salts or compounds may be used excluding zeolites or active carbons, since zeolites act by chemical interchange and active carbon is not a salt.

Thus according to the present invention in a preferred form, liquids are purified by using lime and such acids as form with lime practically water insoluble lime salts, or other compounds are employed which form with lime or with other calcium compounds insoluble lime salts, but the formation of the insoluble lime salts therefrom takes place outside the liquid to be treated and the liquid is then treated with these externally precipitated practically insoluble lime compounds.

The invention has the following advantages:—

(a) It is possible to effect the formation of the precipitate of the insoluble lime salts under such conditions of pressure, concentration, temperature and the like as are most suitable for each lime salt so that the precipitate can be obtained in a physical condition in which it is adapted to exert its most favourable action as adsorption and filtration material. By this means the formation of the precipitate may be fully influenced and lime and acid may be brought into action, one upon the other, at such pressures, temperatures, concentrations, and speeds and under the observance of other factors which influence the formation, so that the said formation takes place under the most favourable conditions, and as regards the purpose of use of the salts employed, particularly so that they may be employed for adsorption (surface action), filtration purposes or for both purposes, whilst the physical condition of the precipitate acquires a special importance.

(b) In consequence of the addition of insoluble lime salts it is possible to ensure that neither a potash alkalinity nor a lime alkalinity results in the solutions; consequently the liquid can be brought to any high temperature at which the most favourable conditions for a rapid and clear filtration and an intense purification are created; thus a saving of lime is also obtained because, as previously mentioned, filtration and purification take place better at high temperatures;

(c) By the use of lime salts which have the most suitable physical condition for the adsorption or for the filtration or for both, the quantities of lime salts required are, in many cases, smaller than those which are otherwise necessary when the formation of the lime salt is allowed to take place in the juice itself. By this means a considerable saving of lime and acid results.

(d) The purification of the liquid is practically instantaneously effected and the impurities and micro-organisms present therein therefore remain only during a very short period in contact with the juice or solution because no saturation process takes place.

(e) The possibility of lactic acid fermentation or other bacterial action which in the well-known carbonatation process may occur, is prevented, because the bacteria are killed by the direct heating of the liquid to a sufficiently high temperature.

(f) The second and third saturation as carried out in the carbonatation process may be dispensed with because even in a single operation an excellent purification and filtration can be obtained. This effects a further saving of lime, lime stone, coal, coke, filter cloths, apparatus, time and workmen's wages. The duration of the treatment of the juice is of course very much shortened in this way, and as less lime is used and less filter cakes made, the losses of sugar thereby caused, are also reduced.

(g) No lime saccharate is formed and a decomposition of the non-sugar substances, such for example as proteins and glucose by means of lime either does not take place or only to a small extent. Hence formation of dark compounds and frothing is excluded and consequently there are no losses of juice from these causes. Of course there need no longer be any question of a loss of carbon dioxide or sulphur dioxide as it is not necessary to pass these substances through the juice and in the formation of the limesalts the gas used may be fully utilized by passing it subsequently through several vessels containing for instance milk of lime.

(h) As no frothing (or formation of scum) takes place the saturation vessels may be almost entirely filled. For this reason and in consequence of the rapid course of the separation it is possible to work with considerably smaller, that is to say, less expensive units of apparatus. Fewer filter presses are also required because the work is carried out with smaller quantities of lime and because if desired the second and third saturations (necessary in the old process) may be entirely omitted. Since smaller quantities of lime are usually used, a smaller lime kiln is also required which means a saving of lime stone and coke. Also either a smaller $SO_2$ plant or a smaller $CO_2$ pump, washer, etc., can be used.

(i) Decompositions of substances, (for example, proteins, glucose and the like) by means of lime also do not take place. For this reason and because less lime is required and because the work is carried out at higher temperatures, smaller quantities of lime and none or smaller quantities of soluble limesalts become dissolved in the juice and solution, so that the yield and quality of sugar are improved and the working of the juices is easier, because they are not viscous, or are less viscous.

(k) Incrustations do not occur or at any rate they take place only to a much smaller extent. It is well known that incrustation for example in the preheaters when "sulphuring" is mainly caused by precipitates (mainly decomposition of bi-sulphites into sulphites, etc.) which form in the liquor in consequence of the heating during the passage of the gas. The addition of already formed precipitates can hardly cause incrustation. Also the sugar crystallizes better because the juice is less viscous. As no alkali acts on the juice, nor darkening of the juice takes place; this is of the greatest importance, especially in the production of white sugar. Spontaneous decomposition in the molasses also no longer takes place.

A further important advantage of the present invention consists in that the reaction of the liquid to be treated can be conveniently influenced. In the previous methods this is excluded because for example, in the carbonatation, the juice is made highly alkaline in consequence of the large quantities of lime employed. This disadvantage is indeed still to be found in the previously mentioned newer improved saturation process.

In the sulphitation ("sulphuring") process among others the reverse course is proposed and the juice in this case first rendered acid and then treated with lime so that the juice is thereby highly acidulated at one stage.

By this invention the natural acidity if any may be allowed to remain, so long as it is so small that it can exercise no deleterious actions such for example, as causing inversion of sugar. But under some circumstances it even is of advantage to create a predetermined degree of acidity or alkalinity.

If the acidity of, e. g., sugar juices is too high, (in the present process) in view of the fact that the operation is principally carried out with a practical insoluble and neutral salt, without the danger of great chemical conversions, the acidity may be wholly or partially neutralized by the addition of an alkali, if desired, or the liquid may be made slightly alkaline so far as this appears necessary in a given case.

In this case also the actual separation takes place also principally by the addition of water insoluble lime salts produced externally by precipitation, i. e., outside the juice or liquid to be treated.

By the use for instance of precipitated calcium carbonate a small part of the same passes over into solution, but it is almost entirely re-precipitated as insoluble lime salt by the acids contained in the juice (phosphoric acid, oxalic acid, and the like).

If the operation is carried out according to this invention, small quantities of lime may also be added to the juice for the purpose of neutralizing its natural acidity and acids may be again employed for eventually removing any surplus quantities of alkali. In such cases acids and alkalies are suitably selected in such a way that they interact to form an insoluble salt. As the acidity of a sugar juice produced from raw sugar cane is comparatively weak, only very small quantities of alkali are necessary for neutralization. The formation of dark coloured substances in the juice may therefore be avoided because the process can be performed without the use of alkalies in certain cases and in the most unfavourable cases with only very small quantities of alkali, and especially because any alkali so introduced may be added in small measured quantities to the juice so that the use of excessive quantities of alkali is avoided.

In spite of this, in using the process in accordance with this invention such large quantities of insoluble lime salt may be introduced into the juice and the operation may be carried out at such temperatures (up to boiling point and beyond) that a good purification and a good separation of the juice can be effected for example by means of filter presses.

Another example which shows the advantages of this process is as follows:—

In treating raw sugar juice by the "sulphuring" process, it is usual first to add lime to the juice and to neutralize the large amount of alkalinity by sulphur dioxide. If however, the juice is first treated with sulphur dioxide lime is subsequently added for the purpose of neutralization.

Also in this process the method has been followed of simultaneously adding lime and sulphur dioxide to the liquid. As is well known, the raw sugar, so formed, contains invert sugar.

This principle of this invention is applicable to the sulphuring process; the sulphite is produced outside the liquid, and the neutral salt so formed is added to the liquid. The juice may thus be heated directly to boiling temperature.

The formation of bi-sulphites, the appearance of a too acid or too alkaline reaction, etc., is also avoided and the same advantages are obtained as with the calcium carbonate process.

The formation of sulphite may take place outside the liquid at any ideal (most suitable) pressure, temperature and concentration in any medium and under any further conditions which are most suitable for the formation of the calcium sulphite. A saving of lime and sulphur dioxide is also thereby obtained.

If for example, beetroot juice which normally does not contain glucose is treated according to the process of this invention, with precipitated calcium carbonate, it may be advisable to make the beetroot juice previously slightly alkaline, and then to add thereto the water insoluble lime salt, after which the juice is heated to boiling point (or beyond it, under pressure) whereupon the liquid after sufficient action is again separated from the precipitate for example, by means of filter presses.

The process may also be carried out by adding no lime (or other alkali) to the juice or only so much that the juice is just neutralized, after which the addition of precipitated insoluble calcium carbonate takes place and the juice is heated and filtered.

As slightly alkaline juice is generally preferred in beetroot sugar manufacture, if no lime has been added to the juice or only as much lime as is necessary for the neutralization of the juice, some further lime or another alkali or alkaline earth may be added to the juice after the filtration whereupon the mass is heated and filtered and then before the second filtration fresh quantities of precipitated calcium carbonate may be added to the liquid.

The advantage thus obtained consists in that the slightly acid or neutral juice may be much more easily filtered than alkaline juice using the same filter materials.

As the raw beetroot juice contains various impurities which are partly insoluble in slightly acid or neutral juice but are dissolved by the addition of lime or another alkali and as also vice versa other juice substances are insoluble in alkaline juice but are dissolved again in slightly acid or neutral juice a better purified juice may be obtained by the use of the two filtrations mentioned (in slightly acid or neutral and in alkaline media).

Of course these methods may also be employed for cane sugar juice and also for cane and beetroot sugar solutions.

The methods hereinbefore described may also be employed with the use of and in combination with base-exchanging silicates, e. g., those known as "permutite", "zeolite" and "chabazite" and the like substances which are based on the principle of the exchange of bases.

In carrying out the process various lime salts may be used which are obtained by precipitation and are practically insoluble in the liquid in which they are employed; these may be used independently or separately by themselves and in a suitable succession, or a mixture or various mixtures may be employed; in the latter case these various mixtures may be employed in suitable succession. The addition to the juice of the separate precipitates or the separate mixture or the various mixtures may take place at any suitable stage of the process, and, within certain limits, as frequently as desired. With this process in addition to beetroot and cane sugar solutions, beetroot and cane sugar juice and other sugar solutions such for instance as solutions of invert sugar, milk sugar (whey), glucose from maize, potatoes, vegetable and fruit juices, molasses and the like, other aqueous and alcoholic liquids may be purified. Examples of these are the treatment of water for technical operations, for example purifying boiler feed water, of water for tanneries, breweries, laundries, dye-works and the like.

Applicant has found by his experiments that the precipitated insoluble lime salts such as calcium carbonate, calcium sulphite, calcium phosphate, calcium sulphate, calcium oxalate, calcium citrate, calcium silicate, calcium tartrate etc., when properly produced, form a good filtering material and that they also have the property of retaining organic and inorganic substances on their surfaces which substances are removed by the subsequent decantation or filtration.

Applicant has also found that calcium phosphate or sulfate in cane sugar juice and cane sugar solutions, more particularly when the insoluble salts are employed in excess, removes a substantial proportion of the organic and inorganic non-sugar substances from the liquid. Further, a very intense decolourizing action is thereby produced. The phosphates however, do not exert an equal decolourizing action on beetroot sugar juice and beetroot sugar solution, in fact, they decolourize cane sugar juice and cane sugar solutions, more intensely than they do beet sugar juice and solutions, more intensely than the first named kind of juice and solutions.

Calcium carbonate shows an opposite behaviour; it decolourizes beetroot sugar juice and beetroot sugar solutions, whilst cane sugar juice and cane sugar solutions are rendered darker in colour by the calcium carbonate. This darker colouration is to be in part ascribed to the circumstance that the cane sugar juice and the cane sugar solutions which in general have an acid reaction are wholly or partially neutralised by the calcium carbonate.

Applicant has further discovered that freshly precipitated lime salts which are insoluble in the liquid in which they are employed, act generally much more intensively than if the salt be dried or exposed to the air after its separation and used in this dried condition.

The separated insoluble lime salts may be freed from surplus water for example by filtration, decantation or centrifugalling; the remaining salt may, if necessary be washed in the separating apparatus or centrifugals for the purpose of freeing it from the adherent mother liquor.

In this way the juice to be treated (solution or other liquid) is prevented from being diluted by the mother liquor of the salt formed.

The following example illustrates the process:—

In employing this invention, instead of the carbon dioxide saturation the procedure is as follows:—

In a vessel provided with an agitator and heating coils, milk of lime for instance of about 5 to 10° Beaumé is saturated with carbon dioxide gas under atmospheric, reduced, or elevated pressure until an approximately neutral reaction exists, during which the mass is maintained at an elevated temperature up to 100° C. or higher.

The salt formed, preferably after removal of the mother liquor, is decanted or centrifugalled or filtered and if desired may be washed with water. This precipitated salt has especially high adsorbing properties, not possessed by ordinary marble, chalk, etc.

By employing any of these separation processes the clear liquid, if it is not too impure can be employed for producing fresh quantities of milk of lime.

In order completely to utilise the $CO_2$ or $SO_2$ employed, the formation of the insoluble calcium precipitate may be effected in closed vessels arranged one behind the other or in series, the escaping gas being used in the following vessel, for example by passing it through milk of lime.

The mass (calcium carbonate) thus obtained may be used in that condition or it may be decanted or centrifugalled or filtered and is added to the liquid to be treated preferably direct in this moist condition.

If for example raw sugar juice is to be treated with this precipitated insoluble lime salt, there is added to 100 parts of the juice to be treated, for example, about ½–1 part (by weight) of this salt (and in treating raw beetroot juice about ¾–2 parts). This quantity of salt is varied according to the properties of the juice and may amount to more or less than the figures stated. The quantity of neutral salt which is added to the mass is in practice regulated mainly according to the desired speed of filtration so as to form a good, firm and porous cake which may be easily freed by washing from the sugar contained therein. Apparently the increase of the degree of purity of the juice is proportioned to the speed of filtration.

On the addition of the salt to the juice the mass is stirred and heated to the boiling point of the juice after which the latter is separated out by means of, e. g., filter presses.

The heating of the agitated mass may also take place by means of preheaters. The cake formed may be washed with water for the purpose of recovering the sugar contained therein. If the juice exhibits too high a natural acidity so that there is the danger of inversion, this acidity may be wholly or partially removed by the addition of an alkali such for example as lime, sodium carbonate and so forth or the juice may even be made slightly alkaline.

The clear filtered juice is concentrated to about 30° Baumé, whereupon the thick juice or syrup may be subjected afresh to the action of a precipitated, neutral lime salt.

Such a subsequent treatment is advisable when the thick juice or syrup shows a clouding by separated salts. This clouding results from the circumstance that certain salts, which in the thin juice are in a dissolved condition, are precipitated on concentration.

This subsequent treatment, for example when raw sugar is to be produced, may be carried out again with calcium carbonate, whilst if the production of white sugar is intended it is advisable to carry out the second treatment with calcium sulphite or calcium phosphate, whereby, in addition to freeing the juice from substances in suspension, a strong de-colourizing of the juice is also obtained; further certain dissolved organic and inorganic non-sugar substances are removed.

Of course, thick juice or syrup cannot be so easily filtered as thin juice. It is therefore frequently desirable to treat thin juice instead of or in addition to thick juice or syrup. If this thick juice or syrup however shows clouding it is preferable to treat such thick juice or syrup in order simultaneously to remove the clouding. In the treatment of thick juice or syrup it is preferable to use a somewhat coarser crystalline lime precipitate or to use calcium sulphite because it is precipitated mostly into coarser particles.

As far as it appears desirable in certain cases the thick juice or syrup as well as the filtered thin juice may be treated with sulphur dioxide. Or, alternatively, the filtered thin juice may be treated with precipitated insoluble salts. For this calcium sulfite or tri-calcium phosphate is adapted.

If this latter treatment is used instead of the sulphur dioxide process, the procedure is similar but with the difference that sulphur dioxide is used instead of carbon dioxide for the purpose of making the precipitated insoluble lime salt. The sulphur dioxide may be employed either in a gaseous form or in an aqueous solution. If tri-calcium phosphate calcium sulphate or calcium oxalate, calcium nitrate, calcium tartrate be employed as the insoluble salt, phosphoric acid, sulphuric acid, oxalic acid, citric acid or tartaric acid respectively are added to the milk of lime, for example in diluted aqueous solution, (and the precipitate, of course, separated in the well known manner).

In using the process for beetroot or cane sugar solutions the process may be carried out in the manner described, the amount of the precipitated insoluble lime salt employed being dependent on the quality of the sugar solution to be treated. This amount governs the filtration. The larger the quantity of lime salt employed, within certain limits, the greater is the speed of filtration and accordingly the cake is more porous, firmer and easier to wash.

Examples of preparation are the action of a base on an acid, e. g., milk of lime, and carbonic acid; a base on a salt, e. g., milk of lime and an acid or neutral sodium salt; a salt on an acid, e. g., calcium carbonate and sulfurous acid; two salts e. g., carbonate of soda and calcium chloride; or heating of an acid salt, e. g., by heating calcium bisulfite solution. The physical consistency of the precipitates can be varied by varying the conditions of precipitation especially the temperature of either or of both of the reacting compounds, the manner in which the reacting substances are brought together, the concentration of the constitutents, the speed of formation of the salt, the pressure applied, etc. Thus in preparing calcium carbonate by means of calcium chloride and carbonate of soda, the physical character of the precipitate is different depending upon whether the soda is added to the calcium chloride or the reverse. Typical salts are calcium phosphate, sulphite and carbonate, but insoluble salts of other metals, e. g., barium, strontium, magnesium, aluminium or the heavy metals, etc., can be used.

As already stated one object of my invention is that in purifying liquids said insoluble salts are applied in combination (that is to say in mixture or in succession) with known adsorbents which improve filtration, or cause decolorization and further purifying action respectively. With the aid of said combination of adsorbents e. g. insoluble calcium salts and decolorizing or active carbon, solutions of raw sugar, with or without prefiltration can be purified and completely decolorized—so as to obtain refined sugar—without the necessity of previous washing the raw sugar.

This result cannot be obtained in practice by using either kind of adsorbents as such, even when the quantity of agent is increased to 10% and more.

The process according to my invention may also be carried out in such a manner, that the raw sugar solution or the like is pretreated with both calcium salts and such adsorbents as active carbon, and then subjected to a chemical treatment with suitable agents e. g. lime or excess of lime and neutralization with an acid such as sulfurous acid, carbonic acid, phosphoric acid and the like.

The calcium or other insoluble salt and the adsorbent such as active carbon may be applied several times without intermediate regeneration on the same liquid in different stages of the purification process or several portions of the said agents may be applied the one after the other.

I am aware of the fact that it has been proposed in the beet sugar industry to re-use the precipitate produced by the carbonatation process and recovered by filter-presses or the like for assiting in the filtration of the first carbonatation juice; also silica precipitate has been suggested for the purification of liquids; silica however is not a salt.

In the appended claims, the expression "substantially insoluble compound which has already been precipitated in a hot menstrum while out of contact with a liquid to be purified", and similar expressions, is intended to imply that the precipitate is formed in a liquid entirely dissimilar to the one being purified, and the precipitate used is not the by-product produced in an earlier run of the process. While it has heretofore been proposed to use calcium carbonate mud forming filter press cakes from defacation of sugar juices, this mud being added to sugar solutions to be purified (e. g., for neutralizing the acidity thereof) such mud cannot adsorb much of the impurities present in the solutions to which it is added, and is not included within the scope of my present claims.

I declare that what I claim is:

1. A process of removing impurities from sugar solutions which comprises treating said solutions with undried freshly precipitated calcium carbonate which has been precipitated in non-sugary solutions at temperatures not substantially below 100° C., and separating the liquid and solid matters.

2. In the purification of sugar solutions, the steps of precipitating a substantially insoluble alkaline earth metal salt having strong adsorption properties, in a non-sugary aqueous solution, and thereafter adding such precipitated material, without previously drying the same, to a sugar solution to be purified.

3. In the purifying of sugar solutions, the steps of precipitating a substantially insoluble calcium salt having strong adsorption properties, in a non-sugary aqueous solution, and thereafter adding such precipitated material, without previously drying the same, to a sugar solution to be purified.

4. A process which comprises suspending lime in water free from sugar, passing gas containing $CO_2$ through such liquid while at near the boiling point, and adding the resulting precipitate, without previously drying the same, to beetroot juice, and filtering.

5. A process which comprises suspending an alkaline earth metal hydroxide in an aqueous non-sugary liquid, passing a gaseous acid anhydrid of which the normal alkaline earth metal salts are insoluble, through such suspension, while at near the boiling point, until the major part at least of the alkaline earth metal has been precipitated in the form of a salt containing such acid anhydrid, then adding such precipitate, without drying the same, to an aqueous sugary solution to be purified, the amount so added being far in excess of the amount which such liquid can dissolve.

In testimony whereof I affix my signature.

JOHAN NICOLAAS ADOLF SAUER.